Nov. 4, 1969  D. M. SWALLOW  3,476,245
VIBRATORY SEPARATOR

Filed Nov. 28, 1966  3 Sheets-Sheet 1

INVENTOR.
DOUGLAS M. SWALLOW
BY
*Julian J. Schamus*
ATTORNEY

Nov. 4, 1969   D. M. SWALLOW   3,476,245
VIBRATORY SEPARATOR

Filed Nov. 28, 1966   2 Sheets-Sheet 2

INVENTOR.
DOUGLAS M. SWALLOW
BY
*Julian J. Schanus*
ATTORNEY

Nov. 4, 1969   D. M. SWALLOW   3,476,245
VIBRATORY SEPARATOR

Filed Nov. 28, 1966   3 Sheets-Sheet 3

INVENTOR.
DOUGLAS M. SWALLOW
BY
Julian J. Schanur
ATTORNEY

# United States Patent Office 3,476,245
Patented Nov. 4, 1969

3,476,245
VIBRATORY SEPARATOR
Douglas M. Swallow, Burlington, Ontario, Canada, assignor to Southwestern Engineering Company, Los Angeles, Calif., a corporation of California
Filed Nov. 28, 1966, Ser. No. 597,359
Int. Cl. B07b 1/38
U.S. Cl. 209—254                    5 Claims

ABSTRACT OF THE DISCLOSURE

A vibratory separator employing an annular screen having a central opening therein for oversize material. A distribution arrangement is provided for feeding material to the periphery of the screen at an angle other than perpendicular to the tangent of the circle formed by the outer edge of the screen.

---

This invention relates to vibratory separators of the type useful in separating solids of different sizes and separating solids from liquids. The invention is particularly directed with means and methods for improving the operation of such a device so as to aid in the distribution of material onto the screen in a manner that increases the through-put capacity of such screen.

Although a horizontal screen vibratory separating device of the type disclosed for example, in U.S. patents 3,035,700; 3,156,643; 3,029,946; 2,777,578; 2,753,999; 2,714,961; 2,696,302; 2,676,706 and 2,284,671 gives a great deal of flexibility in the separation of material by the selections of proper screen size, the appropriate adjustment of the vibrating device which drives it utilizing the improved means for distributing material onto the screen, there have been certain applications in which the vibratory screen apparatus has not been as successful as it might be.

For example, when using the conventional vibrating screen separator to remove a relatively small amount of oversize solids from a large volume of liquid or a small amount of solids in liquid suspension, the capacity of the separator to collect and discharge the separated material is materially retarded by the limited ability to move material across the screen.

The apparatus of the present invention is an improvement on an annular vibratory screening apparatus in which the circular screen has a center discharge opening for oversize and is of the type described and claimed in application Ser. No. 426,908, filed Jan. 21, 1965 by Douglas M. Swallow and assigned to the assignee of the present application, now abandoned.

The distributing means shown in application Ser. No. 426,908 consists of a dome disposed above the screen which distributes material to the outer periphery of the screen and enables the material to move from the outer periphery in a spiral or "rope" like fashion, the oversize or liquid material flowing through the screen and the oversize or reject solid material moving toward the center discharge opening. Although satisfactory in many applications, the dome shaped distributor pan does not take maximum advantage of the potential capacity of the vibratory screen having center discharge provision.

It is, therefore, an object of this invention to provide an improved vibratory separator, which separator employs an annular screen provided with a center opening for oversize, and which, when subject to vibration, is particularly adapted to the separation of large quantities of undersize material from a relatively small quantity of oversized material.

It is a further object of this invention to provide an improved vibratory separator, which separator employs an annular screen provided with a center opening for solids, and which, when subject to vibration, is particularly adapted to the separation of large quantities of liquid from a relatively small quantity of solids.

With the above objects in mind and other objects which may hereinafter appear, reference is directed to the drawings accompanying the specification in which.

The above and other objects of the present invention are accomplished by a device which comprises a novel distributing means, by which means solids semi-solids or liquids are forcefully impelled circumferentially around the outer periphery of the screen.

The various embodiments of the invention all include a vibratory separator comprising: a cylindrical housing structure; a planar screen adapted to receive material to be separated having its outer periphery secured to the housing structure and a central discharge opening; means for vibrating the housing structure and the screen to cause the movement of the material from the outer periphery of the screen toward the discharge opening for discharge of the oversize component of the material therethrough; means under the screen for receiving the component of the material passing through the screen; means communicating with the central opening of the screen to receive the oversize component of said material; and distribution means associated with the periphery of the screen for feeding material to be separated to the periphery at an angle other than perpendicular to the tangent of the circle formed by the outer edge of the screen.

Figure 1:
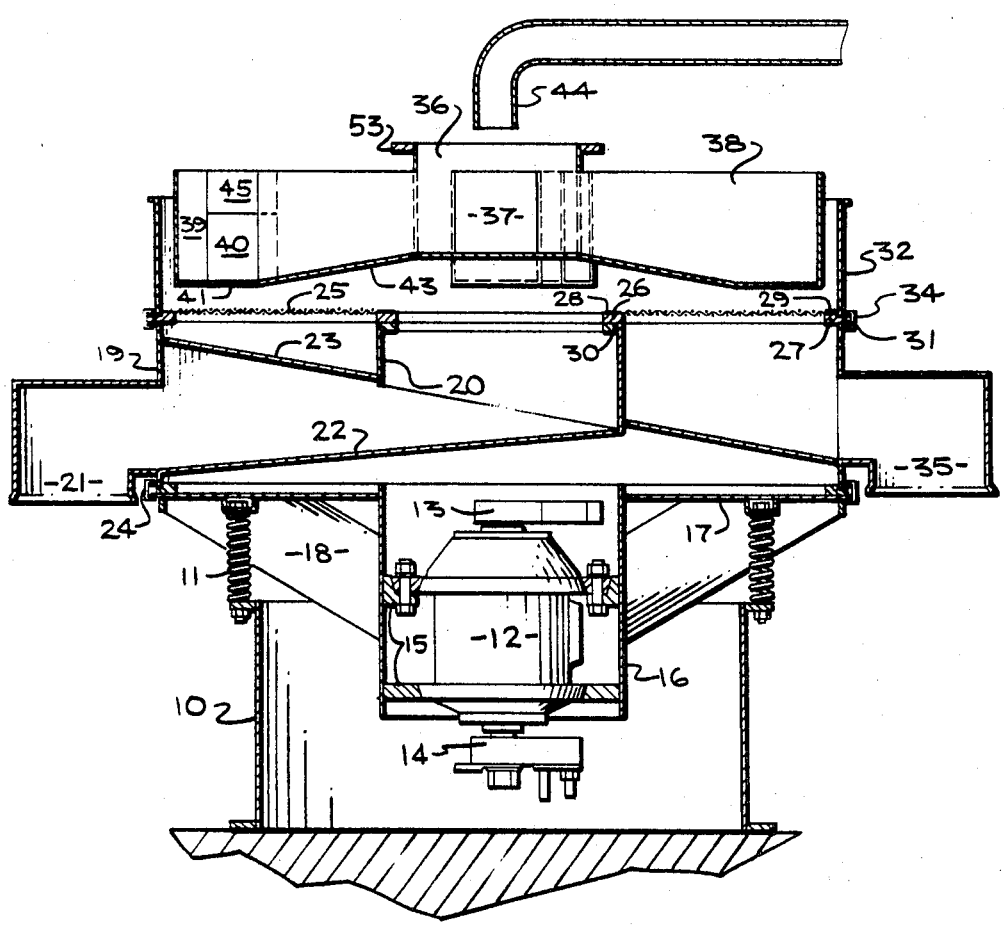
FIGURE 1 is a vertical cross-section view of a vibratory screening apparatus of this invention having a circular configuration.

Referring now to the drawings, the vibratory shaking or screening device, as shown in FIGURE 1, consists of a base frame 10 on the upper portion of which is mounted a ring of springs 11 which supports the vibratory screening device and isolates the vibrations imparted upon such device from the base frame 10.

A vibratory unit comprising a motor 12 and upper and lower eccentric weights 13 and 14 respectively, is mounted by means of the mounting brackets 15 to a cylindrical extension 16 of the upper base 17 which is supported on the ring of springs 11 and is reinforced by gusset plates 18 which project between the springs 11.

The relationship of the vibratory unit and the base frame 10, as described above, may be varied by other arrangements. For example, a motor may be mounted upon the base frame 10. A belt drive from such motor extends to and rotates the eccentric weights which are mounted on the upper base 17.

On the upper base frame 17 is mounted a cylindrical spacing frame 19 having a cylindrical discharge opening 20 projecting upward at the center thereof and communicating with the discharge duct 21 through the sloping curved pan 22.

Secured to the interior of the spacing frame 19 is a sloping receiving pan 23 which is inclined and which is isolated from the interior of the discharge duct 21 by the walls of the opening 20. The pan 23 slopes upwardly from the lower portion of the frame 19 nearest the duct 35 to a point diametrically opposite and adjacent to the upper edge of the frame 19. At the bottom of the frame 19 is a clamp ring 24 which secures the upper base 17 to the frame 19.

The inner periphery and outer periphery of the horizontal screen 25 are secured to inner and outer tension rings 26 and 27 respectively, thus forming a rigid single unit which is horizontally placed onto the vibratory separator unit whereby the inner marginal tension ring 26 rests upon and is secured in a suitable manner to an outer flange 30 projecting inwardly from the upper cylindrical portion of the discharge opening 20.

A lip 31 projects outwardly from the outer marginal tension ring 27, the lip 31 being interposed between spacing frames 19 and 32 and resting upon a flange 33 which projects outwardly from the upper periphery of the spacing frame 19 and which supports the tension ring 27. A clamp ring 34 secures the spacing frames 19 and 32 and the interposed lip 31 of the tension ring 27.

Operation of the center discharge vibratory separator is as follows: the eccentric weights 13 and 14 associated with the motor 12 are so adjusted that materials overlying the annular screen 25 are caused to progress in an essentially spiral or "rope" like path from the outer periphery of the screen to the inner periphery of the screen 25 and discharge through the central opening 20.

The separator of this invention is particularly adapted for the separation of a comparatively small volume of oversize material from a large volume of undersize material capable of passing through the screen by virtue of the improved feed means to be described. As the material to be separated moves across the screen toward the discharge opening 20, the undersize material passes through the screen 25 onto the receiving pan 23 and is discharged through the discharge duct 35. The oversize material continues to move across the screen 25 and is ultimately discharged through the discharge opening 20. The oversize material passes through the discharge opening 20 onto the receiving pan 22 which is inclined upward from a point at the lower portion of the periphery of the frame 19 adjacent the duct 21 to the lower portion of the vertically descending cylindrical discharge opening 20.

When using the dome shaped feed distributing means in which material is dropped vertically onto the periphery of the screen 25, the capacity of the separator is retarded by the fact that motion of the feed is not substantially in a direction which aids its travel across the screen. Because of the vibration of the screen, the direction of travel of the material is not radially inward, but rather the material travels in a circular pattern of decreasing radius or a partial spiral when migrating toward the center. In the dome shaped distributor, the initial direction of the material is radially outward and has no circular component. Thus, the action of the vibrating unit must overcome the inertia of the original velocity components of the material causing a build up around the periphery of the screen.

Rather than merely depositing the material vertically onto the screen, the unique arrangement of this invention, by virtue of the force with which the material is fed and the manner in which the material is deposited onto the screen, impels the material initially circumferentially around the periphery of the screen, thereby providing the required direction of movement to allow the material to move rapidly toward the center and thus greatly increasing the capacity of the device.

Figure 2:
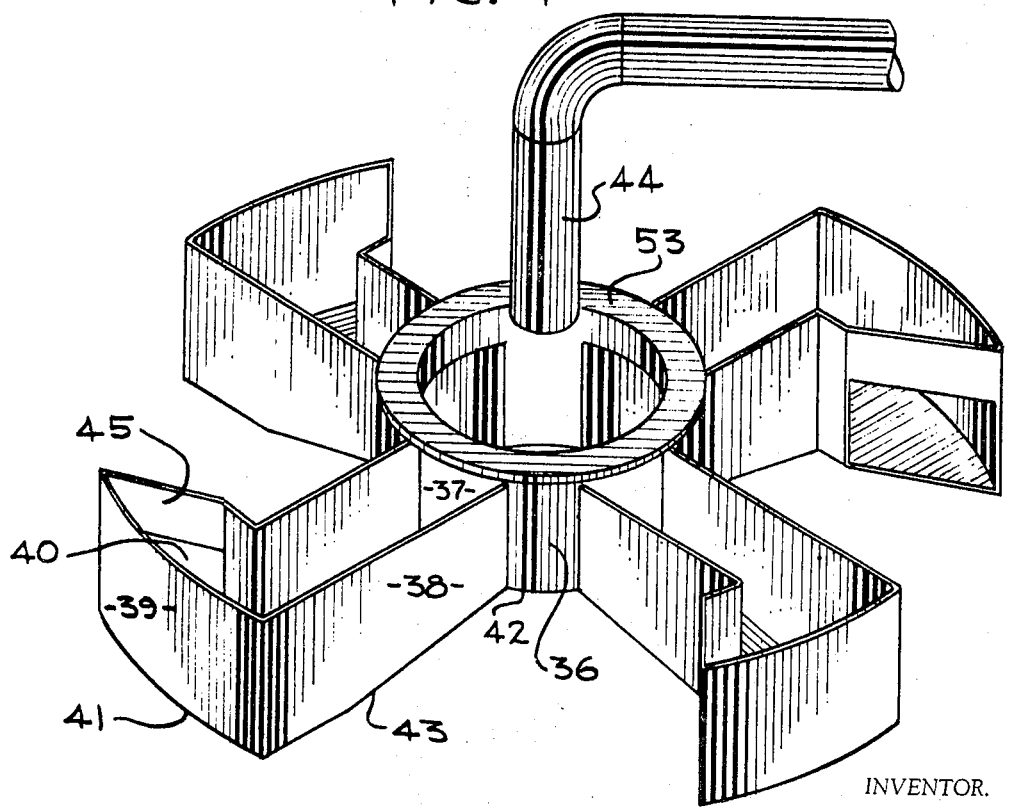
FIGURE 2 is an isolated perspective of a feed distributing means according to this invention.

As shown in FIGURES 1 and 2, a generally cylindrical member 36 is provided with four evenly spaced peripheral openings 37 from each of which a trough shaped arm 38 extends radially toward the periphery of the screen 25. At the outermost end of the radially extending trough 38, the trough, while retaining its basic dimensions, turns with a curvature complementary to the curvature of the spacing frame 32 to form the curved trough 39 which may consist of either a separately formed metal trough or other suitable material which is bonded, welded or otherwise affixed to the radially extending trough 38 or, as an alternative, may consist of a pre-molded trough as a formed extension of the pre-molded trough arms 38. The outer wall of the trough 39 is generally a segment of a circle concentric with frame 32. At the end of the curved trough 39, which is an extension of the radially extending trough 38, is an opening 40 from which material to be separated may flow.

The base 41 of the curved trough 39 is on a lower horizontal plane than the base 43 of the radial trough 38 which, in turn, is lower than base 42 of cylindrical member 36. The bases 43 and 41 slope generally downward toward the opening 40. Such inclination facilitates the flow of material from the cylindrical member 36 to the curved trough 39. Across the upper portions of the mouth of the curved trough 39 is a baffle plate 45, such plate functioning as a means to ensure a relatively even flow of the material from the opening 40 of the curved trough 39.

The above described feed distributing device of this invention may be supported in a manner so as to be disposed slightly above the screen by any desired means (not shown) and is isolated from the vibration of the separator. For example, the feed distributing means, consisting of the cylindrical member 36, the extending arms 38, and the curved trough 39 may be attached in a suitable manner to the feed pipe 44, which is disposed slightly above the cylindrical member 36. The circular flange 53 is provided for structural stability. The cylindrical member 36, radially extending arms 38, and the curved trough, need not necessarily be open troughs, but are preferably open to insure easy access for cleaning purposes. The material, consisting of liquid, solids, or semi-solids are fed to the cylindrical member 36 by a feed pipe 44. Materials entering the cylindrical member 36 disperse through the four openings 37, flow down the radially extending trough arms 38, and are ultimately projected from the curved trough opening 30. The curved trough 39 is curved in such a manner that materials flowing from the opening 40 are forcefully distributed around the periphery of the screens (not shown) in a generally tangential or non-radial direction and in the direction that the materials would tend to spiral across the screen by virtue of the vibratory motion imparted by the vibrating means.

Figure 3:
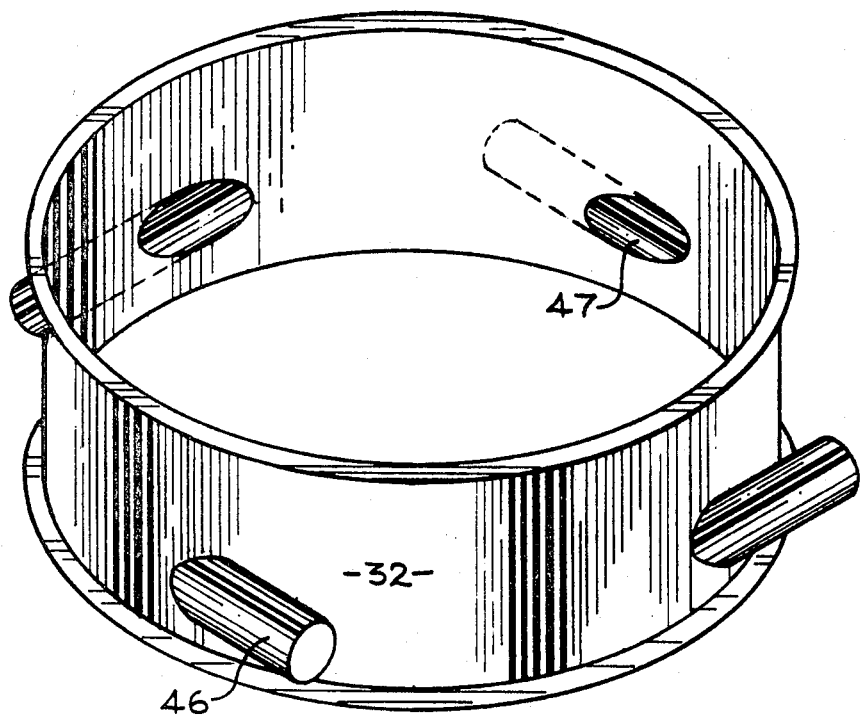
FIGURE 3 is a perspective of a feed distributing of another embodiment of the invention.

In another embodiment of the invention shown in FIGURE 3, one or more feed pipes 46 are set at pre-determined, and preferably evenly spaced, locations about the periphery of the spacing frame 32, project therethrough and are affixed in a suitable manner to the spacing frame so that material flows into the frame in a generally tangential fashion. The material fed through the feed pipes 46 is projected through the provided openings 47 and is distributed upon the periphery of the screen (not shown) in a tangential fashion resulting in a cyclonic effect which causes the material to initially develop the desired circular component of velocity required for efficient movement toward the center.

Figure 4:
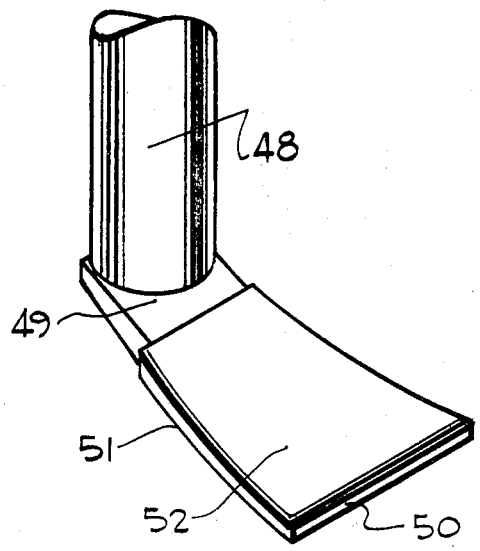
FIGURE 4 is an isolated perspective of another type of feed distributing means of the invention.

In the embodiment shown in FIGURE 4, a vertical feed pipe 48 feeds material to near the inner periphery of the frame 32. The material flows down the pipe 48 into the lower, generally horizontal foot 49 for discharge through the opening 50. To prevent splashing, the foot 49 may have side walls 51 and be covered as indicated at 52. The material flowing through the opening 50 flows onto the screen as a sheet over a substantial portion of the outer periphery of the screen and the foot 49 is positioned so that the flow is generally tangential to the circle formed by the outer edge of the screen at the initial point of contact. As with the other embodiments of the invention, a plurality of the feed pipe and feeder foot arrangements shown in FIGURE 4 may be employed spaced around the interior of the frame and isolated from the vibration of the separator.

Figure 5:
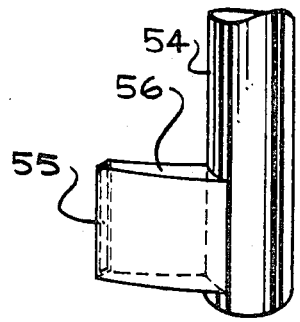
FIGURE 5 is a perspective view of still another feed means according to the invention.
Figure 6:
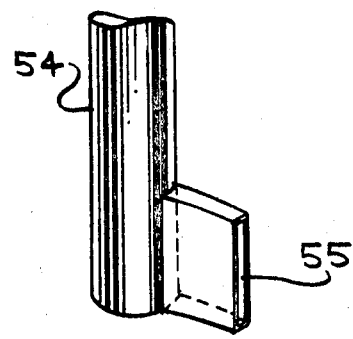
FIGURE 6 is a perspective view of the embodiment of FIGURE 5 taken from a different side.

In the embodiment of the invention shown in FIGURES 5 and 6, a device is depicted which applies material to be separated circumferentially against the inside wall of the frame 32. The embodiment comprises generally a vertical feed pipe 54 terminating at its lower extremity in a sparger 56 having a lateral opening 55 projecting a sheet of material to be separated against the side frame 32. The inner and outer walls of the sparger are curved generally as a segment of a circle concentric with the spacing frame 32; however, the sparger is so constructed that the inner wall thereof converges toward the outer wall so that material passing through the opening 55 is projected with a relatively high velocity against the spacing frame. This embodiment of the invention provides the material to be separated with the circular direction of motion required to rapidly initiate movement toward the center of the screen.

It is to be noted that in the embodiment shown in FIGURE 3, the feed pipe 46 must be isolated by means of a flexible coupling or other arrangement to insure that the vibrations imparted to the separator are not transmitted to the system feeding the pipes 46.

I claim:
1. A vibratory separator, comprising:
 (a) a cylindrical housing structure;
 (b) a planar screen adapted to receive material to be separated having its outer periphery secured to said housing structure and having a central discharge opening;
 (c) means for vibrating said housing structure and said screen to cause the movement of said material from the outer periphery of said screen toward said discharge opening for discharge of the oversize components of said material therethrough;
 (d) means under said screen for receiving the components of said material passing through said screen;
 (e) means communicating with the central opening of said screen to receive said oversize component of said material; and
 (f) distribution means arranged near the periphery of said screen for feeding material to be separated to said periphery, said distribution means including a plurality of feed members for providing a generally arcuate tangential flow of said material around the periphery of said screen.

2. A vibratory separator, comprising:
 (a) a cylindrical housing structure;
 (b) a planar screen adapted to receive material to be separated having its outer periphery secured to said housing structure and having a central discharge opening;
 (c) means for vibrating said housing structure and said screen to cause the movement of said material from the outer periphery of said screen toward said discharge opening for discharge of the oversize components of said material therethrough;
 (d) means under said screen for receiving the components of said material passing through said screen;
 (e) means communicating with the central opening of said screen to receive said oversize component of said material; and,
 (f) distribution means arranged near the periphery of said screen for feeding material to be separated to said periphery, said distribution means including a plurality of feed members for directing said material at an angle other than perpendicular to the tangent of the circle formed by the outer edge of said screen.
 (g) said feed members comprising radially extending arms having curved troughs at the ends thereof for causing said material to pass along said arms and through said troughs to provide a generally tangential flow of said material to the periphery of said screen.

3. A vibratory separator, comprising:
 (a) a cylindrical housing structure;
 (b) a planar screen adapted to receive material to be separated having its outer periphery secured to said housing structure and having a central discharge opening;
 (c) means for vibrating said housing structure and said screen to cause the movement of said material from the outer periphery of said screen toward said discharge opening for discharge of the oversize components of said material therethrough;
 (d) means under said screen for receiving the components of said material passing through said screen;
 (e) means communicating with the central opening of said screen to receive said oversize component of said material; and,
 (f) distribution means arranged near the periphery of said screen for feeding material to be separated to said periphery, said distribution means including a plurality of feed members for directing said material at an angle other than perpendicular to the tangent of the circle formed by the outer edge of said screen,
 (g) said feed members comprising a plurality of feed pipes terminating in respective foot members, said foot members having openings therein for directing said material generally tangentially to the periphery of said screen.

4. A vibratory separator comprising:
 (a) a housing;
 (b) a substantially planar screen adapted to receive material to be separated, said screen having the outer periphery thereof secured to said housing and having a central discharge opening therein;
 (c) means for vibrating said housing and said screen to cause movement of said material from the outer periphery of the screen toward said discharge opening for discharge of oversize components of said material; and,
 (d) distribution means arranged near the periphery of said screen for feeding material to be separated generally tangentially to the periphery of said screen,
 (e) said distribution means comprising a plurality of radially extending members terminating in curved troughs, said troughs feeding material to be separated generally tangentially to the periphery of said screen.

5. A vibratory separator comprising
 (a) a housing,
 (b) a substantially planar screen adapted to receive material to be separated, said screen having the outer periphery thereof secured to said housing and having a central discharge opening therein,
 (c) means for vibrating said housing and said screen to cause movement of said material from the outer periphery of the screen toward said discharge opening for discharge of oversize components of said material, and
 (d) distribution means for feeding material to be separated generally tangentially to the periphery of said screen, said distribution means comprising a plurality of radially extending arms terminating in curved portions at the ends thereof, said arms having openings therein adjacent said curved portions for feeding said material generally tangentially to the periphery of said screen.

References Cited

UNITED STATES PATENTS

| 255,419 | 3/1882 | Craik | 209—309 |
| 2,682,338 | 3/1952 | Hurst | 209—332 |
| 2,748,951 | 6/1956 | Dubach. | |
| 2,913,114 | 11/1959 | Plaven | 209—306 X |
| 2,946,440 | 7/1960 | Simpson | 209—366.5 X |

FOREIGN PATENTS 823,481 12/1951 Germany.

HARRY B. THORNTON, Primary Examiner
ROBERT HALPER, Assistant Examiner

U.S. Cl. X.R.

209—332